United States Patent
Nagai et al.

(10) Patent No.: US 9,802,337 B2
(45) Date of Patent: Oct. 31, 2017

(54) ABRASIVE REGENERATION METHOD

(71) Applicant: KONICA MINOLTA, INC., Chiyoda-ku (JP)

(72) Inventors: Yuuki Nagai, Tachikawa (JP); Akihiro Maezawa, Hino (JP); Atsushi Takahashi, Musashino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/379,060

(22) PCT Filed: Feb. 14, 2013

(86) PCT No.: PCT/JP2013/053468
§ 371 (c)(1),
(2) Date: Aug. 15, 2014

(87) PCT Pub. No.: WO2013/122123
PCT Pub. Date: Aug. 22, 2013

(65) Prior Publication Data
US 2015/0306788 A1  Oct. 29, 2015

(30) Foreign Application Priority Data
Feb. 17, 2012 (JP) ................ 2012-032250

(51) Int. Cl.
*B24B 57/00* (2006.01)
*B01D 21/02* (2006.01)
(Continued)

(52) U.S. Cl.
CPC .............. *B28D 5/007* (2013.01); *B24B 57/00* (2013.01); *B01D 21/02* (2013.01);
(Continued)

(58) Field of Classification Search
CPC ........ B28D 5/007; B24B 57/00; B01D 21/02; B01D 2221/14; C02F 11/14; C02F 103/12
(Continued)

(56) References Cited

U.S. PATENT DOCUMENTS 5,772,900 A   6/1998 Yorita et al.
5,827,114 A * 10/1998 Yam ........................ B24C 1/086
                                                     451/40
(Continued)

FOREIGN PATENT DOCUMENTS

CN    1771586    5/2006
CN    101218068  7/2008
(Continued)

OTHER PUBLICATIONS

Kinzoku-Shigen Report (Report regarding metal resources) p. 45, Nov. 2010 (w/English translation).
(Continued)

*Primary Examiner* — Eileen Morgan
(74) *Attorney, Agent, or Firm* — Cozen O'Connor

(57) ABSTRACT

Technique to provide an abrasive regeneration method which, from a used abrasive, can recover an abrasive by an efficient method and can thereafter obtain a high-purity regenerated abrasive by a simple method. This abrasive regeneration method uses an abrasive comprising at least one type of abrasive selected from diamond, boron nitride, silicon carbide, alumina, alumina zirconia, zirconium oxide and cerium oxide. The abrasive regeneration involves a slurry recovery step (A) for recovering an abrasive slurry discharged from a polishing machine, a separation and concentration step (B) for adding an alkaline earth metal salt as an inorganic salt to the recovered abrasive slurry to aggregate the abrasive, and separating and concentrating the
(Continued)

abrasive from a mother liquor, an abrasive recovery step (C) for recovering the separated and concentrated abrasive, and a second concentration step (D) for filter-treating the concentrated abrasive.

16 Claims, 4 Drawing Sheets

(51) Int. Cl.
*C02F 11/14* (2006.01)
*B28D 5/00* (2006.01)
*C02F 103/12* (2006.01)

(52) U.S. Cl.
CPC .......... *B01D 2221/14* (2013.01); *C02F 11/14* (2013.01); *C02F 2103/12* (2013.01)

(58) Field of Classification Search
USPC .......................................................... 451/56
See application file for complete search history.

(56) References Cited

U.S. PATENT DOCUMENTS

| | | | |
|---|---|---|---|
| 8,512,577 B2* | 8/2013 | Fragiacomo | B01D 3/00 210/195.2 |
| 2008/0250723 A1* | 10/2008 | Fragiacomo | B01D 3/00 51/298 |
| 2014/0331567 A1* | 11/2014 | Takahashi | B24B 57/02 51/298 |
| 2015/0210890 A1* | 7/2015 | Nagai | B24B 57/02 51/309 |
| 2015/0247062 A1* | 9/2015 | Nagai | B24B 57/00 51/309 |

FOREIGN PATENT DOCUMENTS

| | | |
|---|---|---|
| EP | 0 968 801 | 1/2000 |
| JP | 62-279838 | 12/1987 |
| JP | 06-254764 | 9/1994 |
| JP | 11-33560 | 2/1999 |
| JP | 11-050168 | 2/1999 |
| JP | 11-90825 | 4/1999 |
| JP | 2000-254659 | 9/2000 |
| JP | 2001-308041 | 11/2001 |
| JP | 2008-188723 | 8/2008 |
| JP | 2009-172712 | 8/2009 |
| JP | 2010-214515 | 9/2010 |
| JP | 2011-041876 | 3/2011 |
| WO | WO 2007/105714 | 9/2007 |

OTHER PUBLICATIONS

Search Report dated Oct. 1, 2015 which issued in the corresponding European Patent Application No. 13749787.1.
Office Action (and an English translation) dated Oct. 23, 2015 which issued in the corresponding Chinese Patent Application No. 201380009250.5.
Office Action dated Jul. 13, 2016 which issued in the corresponding Chinese Patent Application No. 201380009250.5.
Office Action dated Sep. 27, 2016 which issued in the corresponding Japanese Patent Application No. 2013-558714.
Office Action dated Feb. 7, 2017 which issued in the corresponding Chinese Patent Application No. 201380009250.5.

* cited by examiner

ABRASIVE REGENERATION METHOD

RELATED APPLICATIONS

This is a U.S. National stage of International application No. PCT/JP2013/053468 filed on Feb. 14, 2013.

This patent application claims the priority of Japanese application no. 2012-032250 filed Feb. 17, 2012the disclosure content of which is hereby incorporated by reference.

FIELD OF THE INVENTION

The present invention relates to a method for collecting a used abrasive from an abrasive-containing slurry that contains washing water or an abrasive-containing slurry which was used and reusing the collected abrasive as a regenerated abrasive.

BACKGROUND ART

As an abrasive for finely polishing an object mainly composed of silicon (e.g., an optical glass, a glass substrate for an information storage medium and a semiconductor silicon substrate) in a finishing process, fine particles with high degree of hardness have been used, e.g., particles of diamond, boron nitride, silicon carbide, alumina, alumina-zirconia, zirconium oxide and cerium oxide.

Normally, some of main components of the abrasives are obtained from minerals that are not produced in Japan, and thus rely on imported minerals. In addition, such main components are expensive.

An abrasive for the above purposes is composed of fine particles with high degree of hardness and thus important for uses as an optical abrasive for electronic components such as optical lens, semiconductor silicone substrates and glass plates of liquid crystal displays in large quantity, and its reuse is strongly desired. An abrasive for optical abrasion contains the above-mentioned compound as a main component, and may further contain a transition metal element(s) such as sodium salts and chromium salts and/or a rare-earth element(s) such as yttrium and dysprosium. Thus, such an abrasive for optical abrasion is strictly inhibited from being simply disposed considering environmental pollution. A waste liquid that was used in polishing is therefore strongly desired to be made non-polluting. Hence, techniques to reuse a resource(s) in a waste liquid of an optical abrasive containing a used abrasive and to make a waste liquid non-polluting are important.

In various fields of industry, a conventional method for disposing a waste solution that contains suspended particles normally includes aggregating and separating the suspended particles using a neutralizer, inorganic coagulant or polymeric coagulant, discharging a treated solution and disposing the aggregated and separated sludge by incineration or the like.

An abrasive for the above purposes is used in large quantity in a polishing process, and its waste liquid also contains a component(s) derived from the polished object (e.g., debris of a polished optical glass). In addition, it is difficult to efficiently separate the abrasive from the component(s) derived from the polished object. Because a waste liquid is disposed after use at present as described above, there are problems concerning environmental burdens and disposal cost.

Thus, it has been important to establish a method for efficiently collecting a main component of an abrasive for recycling the rare-earth element which is a scarce material.

As a method for collecting an abrasive component, Patent Document 1 discloses a solid-liquid separation method including adding an electrolyte to a used abrasive liquid that contains a cerium oxide-based abrasive for polishing a glass, maintaining the abrasive liquid temperature at 50° C. for 2 hours to dissolve a component(s) derived from a polished substrate (Si component or Al component), followed by sedimentation and separation of the abrasive. In a method described in Patent Document 1, an alkali metal hydroxide, alkali metal carbonate, alkali metal salt and ammonium salt are used as the electrolyte.

Patent Document 2 discloses a method including adding poly aluminum chloride and a coagulant composed of a polymer to a used abrasive liquid that contains an abrasive mainly composed of cerium oxide to aggregate a solid component of the used abrasive, performing anhydration to obtain a dehydrated cake of the waste abrasive, mixing the waste abrasive with an aqueous sodium hydroxide or aqueous potassium hydroxide to dissolve a water-soluble impurity(ies), and collecting the abrasive by solid-liquid separation. Patent Document 3 discloses a method including adding sulfuric acid to a used abrasive, applying heat thereto, dissolving a rare-earth element or rare metal, and separating and removing an aggregate of silica etc. in the slurry.

Patent Document 4 discloses a method for collecting a colloidal silica-based abrasive, the method including conducting solid-liquid separation by addition of an alkali to a chemical mechanical polishing (CMP) waste liquid in the presence of a magnesium ion to adjust pH to 10 or higher and cause aggregation, adjusting the pH of the solid component in a pH adjusting tank to 9 or lower to elute the magnesium ion, and collecting the abrasive. Non-Patent Document 1 is a review article regarding the above-described metal-collecting methods.

However, the above methods disclosed by Patent Documents 1 to 4 provide a collected abrasive of insufficient purity. Such a collected abrasive is not suitable for fine polishing.

In the method of Patent Document 4, if an abrasive mainly composed of cerium oxide is used in polishing an object mainly composed of silicon such as a glass, addition of an additive such as magnesium chloride to an abrasive-containing slurry that contains a used abrasive at a pH of 10 or higher causes co-aggregation of an abrasive component and a glass component, which lowers the purity of an obtained regenerated abrasive. This is because when the pH is over 10, a component(s) derived from a polished object mainly composed of silicon (e.g., glass) become easier to aggregate than the abrasive component upon addition of an additive.

Patent Document 5 discloses a method for producing a regenerated cerium oxide-containing abrasive by freezing a collected used solution to regenerate secondary particles of cerium oxide followed by removal of water. However, the method of Patent Document 5 requires a huge facility for conducting the freezing and thus requires enormous initial investment.

Even if the above methods are used, it is difficult to concentrate the collected abrasive-containing slurry to a sufficient concentration before separating the abrasive, and thus an unwanted component(s) are contained in the concentrated and collected abrasive-containing slurry. Therefore, the above methods cannot provide a high-purity regenerated abrasive.

PRIOR ART DOCUMENT

Patent Document

Patent Document 1: Japanese Patent Application Laid-Open Publication No. Hei06-254764
Patent Document 2: Japanese Patent Application Laid-Open Publication No. Hei11-90825
Patent Document 3: Japanese Patent Application Laid-Open Publication No. Hei11-50168
Patent Document 4: Japanese Patent Application Laid-Open Publication No. 2000-254659
Patent Document 5: Japanese Patent Application Laid-Open Publication No. 2010-214515

Non-Patent Document

Non-Patent Document 1: Kinzoku-Shigen Report (Report regarding metal resources) p.45, November 2010

SUMMARY OF THE INVENTION

Problems to be Solved by the Invention

The present invention is made in view of the above-described problems to provide a method for regenerating an abrasive, the method including collecting an abrasive from a used abrasive efficiently to obtain a high-purity regenerated abrasive in a simple manner.

Means for Solving Problems

The present inventors have earnestly studied given the above problems, and provide a method for regenerating an abrasive from a used abrasive-containing slurry, separating the abrasive from a mother liquid and conducting a primary concentration of the abrasive by adding a metal salt including an alkali earth metal as an inorganic salt to the collected abrasive-containing slurry and aggregating the abrasive; collecting the abrasive which was separated and concentrated by the primary concentration; and conducting a secondary concentration of the abrasive which was concentrated in the primary concentration and collected by filtration. The present inventors found that this method enables collecting abrasive from a used abrasive efficiently and obtaining a regenerated abrasive in a simple manner. The present invention has been thus made.

That is, the above object of the present invention is accomplished by the following ways.

1. A method for regenerating an abrasive from a used abrasive-containing slurry, the method including following steps:
(A) collecting an abrasive-containing slurry discharged from an abrasive device;
(B) separating the abrasive from a mother liquid and conducting a primary concentration of the abrasive by adding a metal salt including an alkali earth metal as an inorganic salt to the collected abrasive-containing slurry and aggregating the abrasive;
(C) collecting the abrasive which was separated and concentrated by the primary concentration; and
(D) conducting a secondary concentration of the abrasive which was concentrated in the primary concentration and collected by filtration The abrasive is at least one selected from a group consisting of diamond, boron nitride, silicon carbide, alumina, alumina-zirconia, zirconium oxide and cerium oxide.

2. The method of the item 1, further including:
(E) adjusting sizes of particles of the collected abrasive, after the step (D).
3. The method of the item 1 or 2, wherein
the separating and concentrating are conducted at a converted pH of less than 10.0 of the mother liquid at 25° C. in the step (B).
4. The method of any one of the items 1 to 3, wherein
the abrasive is cerium oxide.
5. The method of any one of the items 1 to 4, wherein
a first abrasive-containing slurry that contains washing water and a second abrasive-containing slurry that was used are collected in the step (A).
6. The method of any one of the items 1 to 6, wherein
the metal salt including an alkali earth metal used in the step (B) is a magnesium salt.
7. The method of any one of the items 1 to 6, wherein
in the step (C), the abrasive is collected through separation by decantation utilizing spontaneous sedimentation.
8. The method of any one of the items 1 to 7, wherein
the filtration is conducted using a ceramic filter in the step (D).
9. The method of any one of the items 1 to 8, wherein
in the step (D), the filtration is a repeated operation in which the abrasive collected in the step (C) and pooled in a container is transferred and subjected to the filtration, and thereafter the abrasive is transferred back to the container.
10. The method of any one of the items 1 to 9, wherein
the step (D) is conducted while viscosity of the abrasive is controlled to an optimum level.
11. The method of the item 2, wherein
in the step (D), a dispersing agent is added to a solution of the collected abrasive, and thereafter dispersion of the abrasive is conducted using an ultrasonic disperser and a bead mill disperser as a disperser to control the sizes of the particles of the regenerated abrasive.
12. The method of the item 11, wherein
the disperser used in the step (D) is the ultrasonic disperser.
13. The method of the items 11 or 12, wherein
the dispersing agent is composed of a poly-carboxylic acid-based polymer.
14. The method of the item 5, wherein
the first abrasive-containing slurry and the second abrasive-containing slurry collected in the step (A) are mixed and thereafter subjected to the step (B), the step (C) and the step (D).
15. The method of the item 5, wherein
the first abrasive-containing slurry and the second abrasive-containing slurry collected in the step (A) are separately subjected to the step (B), the step (C) and the step (D).

Effects of the Invention

By virtue of the above ways of the present invention, there is provided a method for regenerating an abrasive, the method including collecting an abrasive from a used abrasive efficiently to obtain a high-purity regenerated abrasive in a simple manner.

The mechanisms of the above effect of the present invention are not fully and definitively revealed, but the following reasoning can be made.

The effect of the present invention is characterized in that the method for selectively collecting an abrasive from a used abrasive-containing slurry in high concentration enables not only collection of an abrasive but also obtainment of a high-purity collected abrasive and easiness of regeneration of the abrasive after the collection.

The technical idea is utilization of a presumable specific interaction between an abrasive and an inorganic salt.

It is common to add a coagulant having high specific weight to a used abrasive to separate the used abrasive as a solid component, followed by purification of the abrasive for regenerating the abrasive. In the collected abrasive which is a solid component, a glass component derived from a polished object and generated in glass polishing such as silicon dioxide particles are also included. To separate this glass component, various further processes are required.

On the other hand, in the method of the present invention for regenerating an abrasive, an inorganic salt, e.g., an alkali earth metal salt is aggregated selectively with an abrasive without causing aggregation of a glass component which is a polished object component in a first step. With this, efficient separation of the above is possible. Then, in the secondary concentrating step D as a second step, the abrasive sediment (abrasive-containing slurry) which was separated through the separating and concentrating step B and the abrasive collecting step C is subjected to filtration so that a mother liquid including a remaining glass component that cannot be removed in the separating and concentrating step B and the abrasive collecting step C is separated from the abrasive sediment (abrasive-containing slurry). Hence, the method of the present invention can greatly increase the concentration of the abrasive in the abrasive sediment. By virtue of this filtration, the abrasive can be selectively separated at a high purity and a subsequent purification is not required. Thus, the method of the present invention can simplify a step (s) after the separation.

In the present invention, it is needed that pH of a mother liquid, namely, a first abrasive-containing slurry that contains the abrasive, washing water and a polished object component and/or of a second abrasive-containing slurry that contains a used abrasive and a polished object component is maintained to be a certain value, that is, equal to or less than pH after the addition of the inorganic salt, from after the addition of the inorganic salt to the separation of the aggregates. Preferably, the separating and concentrating are conducted at the converted pH of the mother liquid at 25° C. of less than 10 in the separating and concentrating step B. Here, the pH after the addition of inorganic salt means the pH right after the end of adding the inorganic salt in the separating and concentrating step B.

Generally, pH of waste liquid is increased to dissolve a glass component in the waste liquid. On the other hand, in the present invention, a glass component is not aggregated by virtue of use of an inorganic salt, e.g., a magnesium salt. Thus, pH adjustment is not required.

It is also found that the inorganic salt used in collecting an abrasive is partially absorbed in abrasive particles and thus remains in the regenerated abrasive, and found that such partially absorbed inorganic salt is bonded to the abrasive via a peculiar bond and prevents the abrasive from becoming particles that are too fine for future use as an abrasive.

EMBODIMENTS FOR CARRYING OUT THE INVENTION

Figure 1:
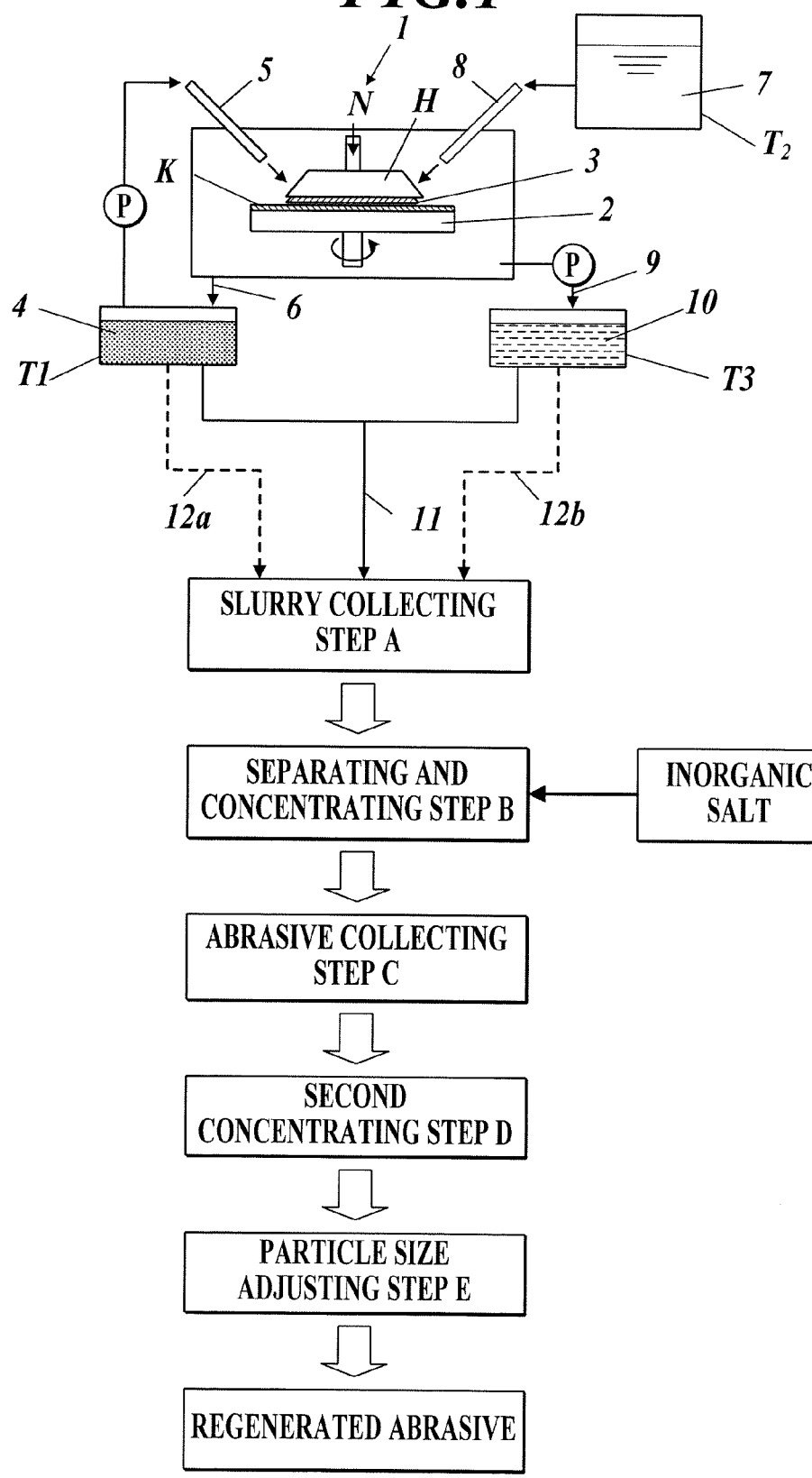
FIG. 1 This is a schematic diagram illustrating a flow chart of elemental steps of the method of the present invention for regenerating an abrasive.

A method for regenerating an abrasive of an embodiment of the present invention is a method for regenerating an abrasive from a used abrasive-containing slurry. The abrasive is at least one selected from a group consisting of diamond, boron nitride, silicon carbide, alumina, alumina-zirconia, zirconium oxide and cerium oxide. The method includes 1) a slurry collecting step A for collecting an abrasive-containing slurry discharged from an abrasive device, 2) a separating and concentrating step B for separating the abrasive from a mother liquid and conducting a primary concentration of the abrasive by adding a metal salt including an alkali earth metal as an inorganic salt to the collected abrasive-containing slurry and aggregating the abrasive, 3) an abrasive-collecting step C for collecting the abrasive which was separated and concentrated by the primary concentration, and 4) secondary concentrating step D for conducting a secondary concentration of the abrasive which was concentrated in the primary concentration and collected by filtration. This feature is common in the inventions of claims 1 to 15.

As embodiments of the present invention, preferably, a particle size adjusting step E is conducted for adjusting sizes of particles of the collected abrasive, after the step (D). Preferably, the separating and concentrating are conducted at a converted pH of less than 10.0 of the mother liquid at 25° C. in the step (B) to separate the abrasive from the mother liquid and concentrate the abrasive more efficiently.

Preferably, the abrasive is cerium oxide. It is also preferable that a first abrasive-containing slurry that contains washing water and a second abrasive-containing slurry that was used are collected in the step (A).

Preferably, the metal salt including an alkali earth metal used in the step (B) is a magnesium salt. It is also preferable that, in the step (C), the abrasive is collected through separation by decantation utilizing spontaneous sedimentation. Also preferably, the filtration is conducted using a ceramic filter in the step (D) to perform the filtration more efficiently.

Preferably, according to the abrasive regeneration method of the present invention, in the step (D), the filtration is a repeated operation in which the abrasive collected in the step (C) and pooled in a container is transferred and subjected to the filtration, and thereafter the abrasive is transferred back to the container. It is also preferable that the step (D) is conducted while viscosity of the abrasive is controlled to an optimum level.

Preferably, in the step (D), a dispersing agent is added to a solution of the collected abrasive, and thereafter dispersion of the abrasive is conducted using an ultrasonic disperser and a bead mill disperser as a disperser to control the sizes of the particles of the regenerated abrasive. It is also preferable that according to the abrasive regeneration method of the present invention, the disperser used in the step (D) is the ultrasonic disperser. Also, it is preferable that the dispersing agent is composed of a poly-carboxylic acid-based polymer.

Preferably, the first abrasive-containing slurry and the second abrasive-containing slurry collected in the step (A) are mixed and thereafter subjected to the step (B), the step (C) and the step (D) or the first abrasive-containing slurry and the second abrasive-containing slurry collected in the step (A) are separately subjected to the step (B), the step (C) and the step (D), to achieve the effects of the present invention more sufficiently.

The present invention, and elements and embodiments thereof will now be described in detail. Ranges of values expressed with "(from) A to B" in the following description include the values A and B as the minimum and maximum values of the ranges.

<<Method for Separating Abrasive>>

A flow chart of the steps of the whole method of an embodiment of the present invention for regenerating an abrasive will now be described with reference to the drawings.

FIG. 1 is a schematic diagram illustrating a flow chart of elemental steps of the method of the present invention for regenerating an abrasive.

In a polishing process illustrated in FIG. 1, an abrasive device 1 includes an abrasive surface plate 2 on which an abrasive cloth K composed of a non-woven cloth, synthetic resin foam or synthetic leather is adhered. The abrasive surface plate 2 is rotatable. In polishing, the abrasive surface plate 2 is rotated while an object 3 to be polished (e.g., optical glass) is pushed against the abrasive surface plate 2 with a predetermined pressure force N using a holder H. Simultaneously, an abrasive-containing liquid 4 (i.e., the second abrasive-containing slurry) is supplied through a slurry nozzle 5 using a pump P. The abrasive-containing liquid 4 (second abrasive-containing slurry) used in the polishing passes through a flow path 6 and is then put and pooled in a slurry tank $T_1$. The abrasive-containing liquid 4 is repeatedly circulated through the abrasive device 1 and the slurry tank $T_1$.

Washing water 7 is pooled in a washing water tank $T_2$, and for washing the abrasive device 1, sprayed through a washing water-spraying nozzle 8 to a polishing portion. Then, an abrasive-containing wash liquid 10 (first abrasive-containing slurry) passes through a flow path 9 through a pump and is then put and pooled in a wash liquid tank $T_3$. The wash liquid tank $T_3$ is used for pooling the wash liquid that was used in the washing (rinsing). The pooled liquid is continuously stirred using a stirring blade to avoid sedimentation and aggregation.

The abrasive-containing liquid 4 (second abrasive-containing slurry) generated in the above polishing that is pooled in the slurry tank $T_1$ and circulated and used, and the wash liquid 10 (first abrasive-containing slurry) that is pooled in the wash liquid tank $T_3$ both contain not only particles of the abrasive but also a polished object component(s) removed from the polished object 3 (e.g., glass) which is polished in the polishing process.

Subsequently, the abrasive-containing liquid 4 (second abrasive-containing slurry) and the wash liquid 10 (first abrasive-containing slurry) are mixed and then collected, or are separately collected. This step is defined as a slurry collecting step A.

Thereafter, to a mixture of or each of the abrasive-containing liquid 4 (second abrasive-containing slurry) and the wash liquid 10 (first abrasive-containing slurry) which are collected in the slurry collecting step A (the mixture of these liquids is called a mother liquid, and each liquid is also called a mother liquid), an alkali earth metal salt is added as an inorganic salt, and in a state that the abrasive is selectively aggregated and the polished object component(s) (e.g., glass powder) is not aggregated, the abrasive is selectively separated from the mother liquid and the abrasive-containing slurry is concentrated (a separating and concentrating step B).

Then, solid-liquid separation is conducted utilizing spontaneous sedimentation to separate the concentrate which contains the abrasive from a supernatant which contains a polished object component(s). No forcible way is employed in this separation. The mother liquid 13 is thus separated into the supernatant 17 containing the polished object component(s) etc. and the concentrate 18 containing the collected abrasive sediment. Thereafter, the supernatant is disposed by decantation, e.g., tilting of the container, or by putting a discharging pipe to reach near the interface between the supernatant 17 and the concentrate 18 in the container so as to discharge only the supernatant 17 from the container and collect the abrasive (an abrasive collecting step C).

In the abrasive collecting step C after the separating and concentrating step B, no forcible way is employed in the separation and solid-liquid separation is conducted only utilizing spontaneous sedimentation to separate the concentrate 18 (abrasive-containing slurry) from the mother liquid 13. When the supernatant 17 is removed, a certain amount of the supernatant 17 is included in the concentrate 18 on the bottom to prevent the concentrate 18 on the bottom from being discharged to the outside of the system. Thus, the collected concentrate 18 (abrasive-containing slurry) contains a certain amount of the supernatant 17, which reduces the degree of pureness of the finally collected product.

In the present invention, as the secondary concentrating step D, the concentrate (abrasive-containing slurry) 18 which contains a certain amount of the supernatant 17 is subjected to filtration using a filter so as to remove the supernatant 17 including glass component that was not completely removed from the collected concentrate 18 in the abrasive collecting step C. Thus, a high-purity collected abrasive can be obtained.

In the present invention, after the secondary concentrating step D, it is preferable that the particle size adjusting step E is conducted on the separated and concentrated abrasive-containing slurry. In the separated and concentrated abrasive-containing slurry, particles of the abrasive form aggregates (i.e., secondary particles) together with the inorganic salt. In order to break the aggregates into almost pure primary particles, water and a dispersing agent are added, and a dispersing device is used to obtain particles with desired sizes.

A high-quality and high-purity regenerated abrasive can be thus obtained in such a simple manner.

Next, details of the method of the embodiment of the present invention for regenerating an abrasive and techniques for the method will now be described.

[Abrasive]

Generally, fine particles of Bengala ($\alpha$ $Fe_2O_3$), cerium oxide, aluminum oxide, manganese oxide and/or zirconium oxide, or colloidal silica is dispersed as an abrasive in water or oil to form a slurry, and it is used for polishing optical glasses, semiconductor substrates and the like. The abrasive regeneration method of the present invention is applied to collecting an abrasive which is at least one selected from the group consisting of diamond, boron nitride, silicon carbide, alumina, alumina-zirconia, zirconium oxide and cerium oxide. These abrasives are applicable to Chemical Mechanical Polishing (CMP). CMP utilizes mechanical and chemical actions and achieves sufficient speed and highly fine flatness in polishing the surface of a semiconductor substrate or a glass.

As the abrasive used in the present invention, examples of diamond abrasives include synthetic diamond (manufactured by NINON MICRO COATING CO., LTD.) and mined diamond. Examples of boron nitride abrasives include cubic boron nitride BN (manufactured by SHOWA DENKO K.K.). Boron nitride abrasives are second to diamond abrasives in terms of the degree of hardness. Examples of silicon carbide abrasives include silicon carbide abrasives, green silicon carbide abrasives and black silicon carbides (manufactured by NINON MICRO COATING CO., LTD.). Examples of alumina abrasives include alumina abrasives, brown fused alumina abrasives, white fused alumina abrasives, pink fused alumina abrasives, cracked alumina abrasives and alumina-zirconia abrasives (manufactured by, for example, Saint Gobain K.K.). Examples of zirconium oxide abrasives include BR series zirconium oxide manufactured by DAIICHI KIGENSO KAGAKU KOGYO CO., LTD. and zirconium oxide manufactured by China HZ.

As to cerium oxide, actually, cerium oxide used as an abrasive is preferably not a pure cerium oxide but is so-called bastnaesite which is prepared by sintering a mineral ore rich in rare earth elements and crashing the mineral ore. In this cerium oxide, cerium oxide is present as a main component. In addition, other rare earth elements such as lanthanum, neodymium, praseodymium and the like are also contained in the cerium oxide. Fluorides of them may be contained in the cerium oxide in addition to oxides of them.

The composition and shape of the abrasive used in the present invention is not particularly limited. A commercially available abrasive can be used as the abrasive in the present invention. Preferably, the content of abrasive component is 50% by mass or more to achieve the effects of the present invention more sufficiently.

[Polishing Process]

The abrasive is used in the polishing process as illustrated in FIG. 1. The present invention is a method for regenerating an abrasive from a used abrasive that is used as described below.

Taking polishing of a glass substrate as an example, a polishing process is normally composed of preparing an abrasive-containing slurry, polishing and washing of a polishing portion, as illustrated in FIG. 1.

(1) Preparation of Abrasive-Containing Slurry

Powder of an abrasive is added in an amount of 1 to 40% by mass to a solvent such as water and then dispersed in the solvent to obtain an abrasive-containing slurry. This abrasive-containing slurry is circulated through an abrasive device and used as illustrated in FIG. 1. The fine particles used as the abrasive have an average size ranging from several dozen nanometers to several micrometers.

It is preferable that aggregation of the abrasive particles is prevented by adding a dispersing agent and the like, and dispersing state is maintained by stirring using a stirrer or the like. In general, it is preferable that a tank used for pooling an abrasive-containing slurry is arranged next to an abrasive device, dispersing state is maintained using a stirrer or the like, and the abrasive-containing slurry is supplied to the abrasive device and circulated through the abrasive device using a supplying pump.

(2) Polishing

As illustrated in FIG. 1, a glass substrate is polished by bringing the object 3 to be polished (e.g., the glass substrate) into contact with the abrasive pad (abrasive cloth K) and moving the glass substrate 3 and the abrasive pad K relative to each other applying pressure force while supplying the abrasive-containing slurry to the contacting face.

(3) Washing

When the polishing is finished, a large quantity of the abrasive is present on the glass substrate and the abrasive device. Thus, water or the like is supplied in place of the abrasive-containing slurry after the polishing to wash the abrasive to remove it from the glass substrate and the abrasive device, as explained above with reference to FIG. 1. Then, the washing water 10 which contains the abrasive is discharged to the outside of the polishing system 9.

As a result of the washing, a certain amount of the abrasive is discharged to the outside of the polishing system, and thus the amount of the abrasive in the polishing system is reduced. To make up for this reduction, a fresh abrasive-containing slurry is newly supplied to the slurry tank $T_1$. The addition may be conducted once every polishing process or once every predetermined times of repeated polishing process. Preferably, the abrasive is in a well-dispersed state in the solvent when added.

[Used Abrasive-Containing Slurry]

In the present invention, the used abrasive-containing slurry is the abrasive-containing slurry discharged to the outside of the system including the abrasive device 1, the slurry tank $T_1$ and the wash liquid tank $T_3$, and is categorized mainly into the following two types.

One is a first abrasive-containing slurry which contains the washing water discharged in the washing process and is pooled in the wash liquid tank $T_3$ (a rinse slurry), and the other is a second abrasive-containing slurry that was used and is pooled in the slurry tank $T_1$, and that is disposed after use for a certain number of times of polishing (a life-ended slurry). In the present invention, they are called the first abrasive-containing slurry and the second abrasive-containing slurry, respectively. The present invention is preferably applied to both of the first abrasive-containing slurry and the second abrasive-containing slurry, but may be applied to either of them.

The first abrasive-containing slurry which contains the washing water is characterized by the following two features.

1) This slurry is discharged in the washing. Thus, this slurry contains a large amount of the washing water and the concentration of the abrasive in this slurry is drastically lower than that of the slurry in the tank.

2) The glass component which was present on the abrasive cloth K or the like is included in this first abrasive-containing slurry as a result of the washing.

On the other hand, the second abrasive-containing slurry is characterized in that the concentration of the glass component is higher than that of a fresh abrasive-containing slurry.

[Regeneration of Abrasive]

In the present invention, the method for regenerating the abrasive and reusing the abrasive as the regenerated abrasive is composed of five steps, namely, the slurry collecting step A, the separating and concentrating step B, the abrasive collecting step C, the secondary concentrating step D and the particle size adjusting step E, as briefly explained in FIG. 1 (manufacturing flow).

(1: Slurry Collecting Step A)

In this step, the abrasive-containing slurry discharged from the system composed of the abrasive device and the slurry tank is collected. The slurry to be collected in this step is categorized into the first abrasive-containing slurry which contains the washing water and the second abrasive-containing slurry which was used.

Generally, the concentration of the abrasive in the collected abrasive-containing slurry is 0.1 to 40% by mass.

The collected abrasive-containing slurry may be subjected to the separating step immediately after the collection or may be pooled to obtain a certain amount of the collected abrasive-containing slurry. In each case, it is preferable to continuously stir the collected abrasive-containing slurry to prevent aggregation and sediment of the particles and to maintain the stable dispersing state.

In the present invention, the first abrasive-containing slurry and the second abrasive-containing slurry collected in the slurry collecting step A may be mixed with each other to prepare the mother liquid and then subjected to the separating and concentrating step B and the abrasive collecting step C. Otherwise, the first abrasive-containing slurry and the second abrasive-containing slurry collected in the slurry collecting step A may be separately subjected to the separating and concentrating step B and the abrasive collecting step C as the mother liquids independent from each other.

(2: Separating and Concentrating Step B)

The collected abrasive-containing slurry which was used contains a glass component derived from the polished object. The concentration of the abrasive is decreased due to influx of the washing water. To reuse the collected abrasive for the polishing, the glass component and the like which are the polished object (s) need to be separated, and the abrasive component needs to be concentrated.

In the separating and concentrating step B of the method of the present invention, an alkali earth metal salt is added as an inorganic salt to the collected abrasive-containing slurry (mother liquid) which was collected in the slurry collecting step A to aggregate the abrasive selectively and not to aggregate the polished object component(s). The abrasive is separated from the mother liquid and concentrated. Hence, the abrasive component is aggregated selectively and then sedimentation occurs. The aggregate is thus separated while most of the glass component remains in the supernatant. Thus, this step enables both of the separation of the abrasive component from the glass component and the concentration in the abrasive-containing slurry.

Specific operations will now be described with reference to FIG. 2.

Figure 2:
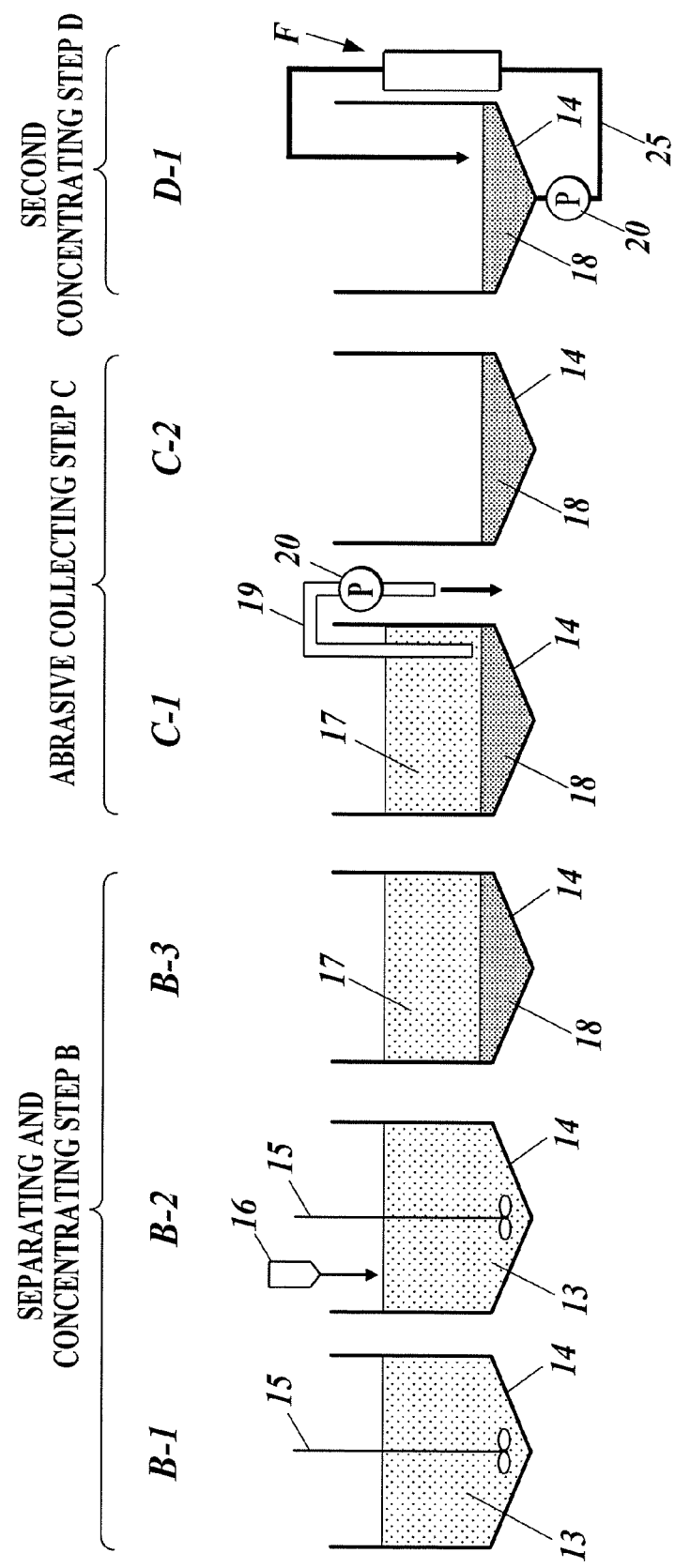
FIG. 2 This is a schematic diagram illustrating an example of a flow in a separating and concentrating step B, an abrasive collecting step C and a secondary concentrating step D of the method of the present invention for regenerating an abrasive.

FIG. 2 is a schematic diagram illustrating an example of a flow in a separating and concentrating step B, an abrasive collecting step C, and a second concentrating step D of the method of the present invention for regenerating an abrasive.

As a step (B-1), the abrasive-containing slurry (mother liquid) 13 which was collected in the previous slurry collecting step A is poured into a conditioning container 14 equipped with a stirrer 15. Then, as a step (B-2), an alkali earth metal salt is added as an inorganic salt with the addition container 16 to the abrasive-containing slurry (mother liquid) 13 while the abrasive-containing slurry (mother liquid) 13 is stirred. Subsequently, as a step (B-3), by adding the inorganic salt, the abrasive particles in the abrasive-containing slurry (mother liquid) 13 settle on the bottom to generate a concentrate 18. A polished object components) such as glass is included in the supernatant 17 from which the abrasive is separated and settled. The abrasive and the polished object component are thus separated from each other.

<Alkali Earth Metal Salt>

In the present invention, the inorganic salt used for aggregating the abrasive is preferably an alkali earth metal salt.

Examples of the alkali earth metal salt used in the present invention include calcium salts, strontium salts and barium salts. In addition, in a broad sense, elements of Group 2 of the periodic table is also defined as alkali earth metals. Thus, beryllium salts and magnesium salts are also regarded as the alkali earth metal salts in the present invention.

The alkali earth metal salt used in the present invention is preferably a halide, a sulfate, a carbonate, an acetate or the like.

Preferably, the inorganic salt used in the present invention is an alkali earth metal salt, and more preferably a magnesium salt.

Any electrolyte magnesium salt may be used in the present invention without particular limitation. In terms of high solubility in water, magnesium chloride, magnesium bromide, magnesium iodide, magnesium sulfate and magnesium acetate are preferable. In terms of a small change in pH and easiness of treating the sediment of the abrasive and the waste liquid, magnesium chloride and magnesium sulfate are particularly preferable.

<Method for Adding Inorganic Salt>

A method for adding the inorganic salt to the abrasive-containing slurry (mother liquid) 13 will now be described.

a) Concentration of Inorganic Salt

The inorganic salt may be directly added to the abrasive-containing slurry (mother liquid), or may be dissolved in a solvent such as water and then added to the abrasive-containing slurry (mother liquid). It is preferable that the inorganic salt is dissolved in a solvent and then added to the abrasive-containing slurry to obtain a homogeneous state in the slurry after the addition.

The concentration of the inorganic salt is preferably 0.5 to 50% by mass in an aqueous solution. To suppress a change in pH of the system and achieve more efficient separation of the abrasive from the glass component, the concentration is preferably 10 to 40% by mass.

b) Temperature in Adding Inorganic Salt

The temperature when the inorganic salt is added may be in the range from the freezing temperature of the collected abrasive-containing slurry to 90° C. To efficiently separate the glass component, the temperature is preferably 10 to 40° C., and more preferably 15 to 35° C.

c) Speed of Adding Inorganic Salt

Speed of adding the inorganic salt to the abrasive-containing slurry (mother liquid) is preferably adjusted so that a portion with the high concentration in the collected abrasive-containing slurry is not generated and the added inorganic salt is homogeneously present in the collected abrasive-containing slurry. The amount of the added magnesium salt per minute is preferably 20% by mass or less, more preferably 10% by mass or less, per the total amount of the inorganic salt to be added.

d) pH Value after Addition of Inorganic Salt

In the method of the present invention for regenerating an abrasive, it is preferable that pH of the collected abrasive-containing slurry is not adjusted in advance when the inorganic salt is added in the separating and concentrating step B. Generally, the collected abrasive-containing slurry exhibits alkalinity and its pH ranges from 8 to less than 10 because of the presence of the glass component. Thus, it is not needed to adjust the pH of the collected abrasive-containing slurry in advance. Therefore, in the present invention, it is preferable that the separating and concentrating is conducted at a converted pH of the mother liquid at 25° C. of less than 10.0.

In the present invention, the pH is obtained from the measurement at 25° C. using the Lacombe tester bench pH meter (pH1500, manufactured by AS ONE CORPORATION).

In the present invention, it is preferable that the pH is maintained to be equal to or less than the pH after the addition of the inorganic salt, upon the addition of the inorganic salt to the separation of the concentrate. In the present invention, the pH after the addition of the inorganic salt is the pH right after the end of adding the inorganic salt.

Until the end of separating the aggregate, the pH is maintained to be equal to or less than the pH after the addition of the inorganic salt. Preferably, the pH which is a converted pH at 25° C. is maintained less than 10. By maintaining the pH less than 10, it is possible to prevent the glass component in the waste liquid from aggregating, and thus the purity of the collected cerium oxide can increase.

The minimum value of the pH after the addition of the inorganic salt is 6.5 or more considering decrease in the purity due to a pH adjusting agent and handleability.

e) Stirring after Addition of Inorganic Salt

After the addition of the inorganic salt, the stirring is continued for preferably 10 minutes or more, and more preferably 30 minutes or more. Upon the addition of the inorganic salt, the aggregation of the abrasive particles starts. The continuous stirring makes the aggregation state homogeneous in the system and reduces the particle size distribution, which makes the subsequent separation easy.

(3: Abrasive Collecting Step C)

In the separating and concentrating step B, the concentrate 18 which contains the collected abrasive particles is separated from the supernatant 17 which contains the glass component, and then the concentrate 18 is collected, as illustrated in FIG. 2.

a) Method for Separating Concentrate of Abrasive

As the method for separating a concentrate of an abrasive aggregate obtained by addition of an inorganic salt from a supernatant, a common solid-liquid separation method can be used. For example, spontaneous sedimentation can be utilized to remove only the supernatant for separating the supernatant. A forcible method utilizing mechanical actions such as a method using a centrifugal separator can also be employable. As a primary concentration method for the present invention, a method utilizing spontaneous sedimentation is preferable to avoid contamination as much as possible by an impurity(ies) (e.g., glass crude particles derived from a polished glass) in the concentrate 18 settled on the bottom and to obtain a high-purity regenerated abrasive.

By the addition of the inorganic salt, the specific weight of the concentrate 18 is higher than that of the collected slurry because the supernatant is separated with the collected abrasive particles aggregated, and thus the abrasive is concentrated. The concentration of the collected abrasive in this concentrate 18 is higher than that of the collected slurry.

For example, the separation of the concentrate 18 of the aggregate of the abrasive from the supernatant 17 can be conducted as follows. As illustrated in FIG. 2, the concentrate 18 which contains the abrasive settled on the bottom is separated from the supernatant 17 which contains the polished object component(s) utilizing spontaneous sedimentation as the step (B-3). Thereafter, the discharging pipe 19 is put in the container 14 to reach near the interface between the supernatant 17 and the concentrate 18, and then only the supernatant 17 is discharged to the outside of the container using the pump 20, as the step (C-1). Subsequently, the concentrate 18 which contains the abrasive is collected.

(4: Secondary Concentrating Step D)

In the abrasive collecting step C, the concentrate 18 which contains the collected abrasive is separated from the collected abrasive-containing slurry 13. However, because spontaneous sedimentation is utilized for the separation to avoid contamination of an impurity(ies), a certain amount of the supernatant 17 is not separated and removed and thus remains in the concentrate 18. Thus, in the present invention, the filtration of the concentrate 18 is conducted as the secondary concentrating step D to remove the component of the supernatant 17 included in the concentrate 18 and to increase the purity of the collected abrasive. The filtration may be conducted before the separating and concentrating step B. However, in terms of productivity, it is preferable that the secondary concentrating step D is conducted after removing a certain amount of the glass component in the separating and concentrating step B and the abrasive collecting step C to avoid clogging of the filter by the glass component in the collected slurry.

As illustrated in FIG. 2, after the concentrate 18 which contains the collected abrasive is separated from the abrasive-containing slurry 13 utilizing spontaneous sedimentation in the step (C-2) of the abrasive collecting step C, the concentrate 18 is further treated in the next step, namely, the secondary concentrating step D. Specifically, as a step (D-1), the concentrate 18 pooled in the conditioning container 14 is transferred to a filtration-concentration unit F using a pump 20 through a pipe 25. In the filtration-concentration unit F, the supernatant 17 in the concentrate 18 is removed using a filter to the outside of the system. Then, the filtrated concentrate is put in the container again. By conducting this filtration process over a certain time period, the concentrate that contains a high-purity abrasive can be obtained.

The secondary concentrating step D of the present invention will now be described in detail with reference to FIG. 3.

Figure 3:
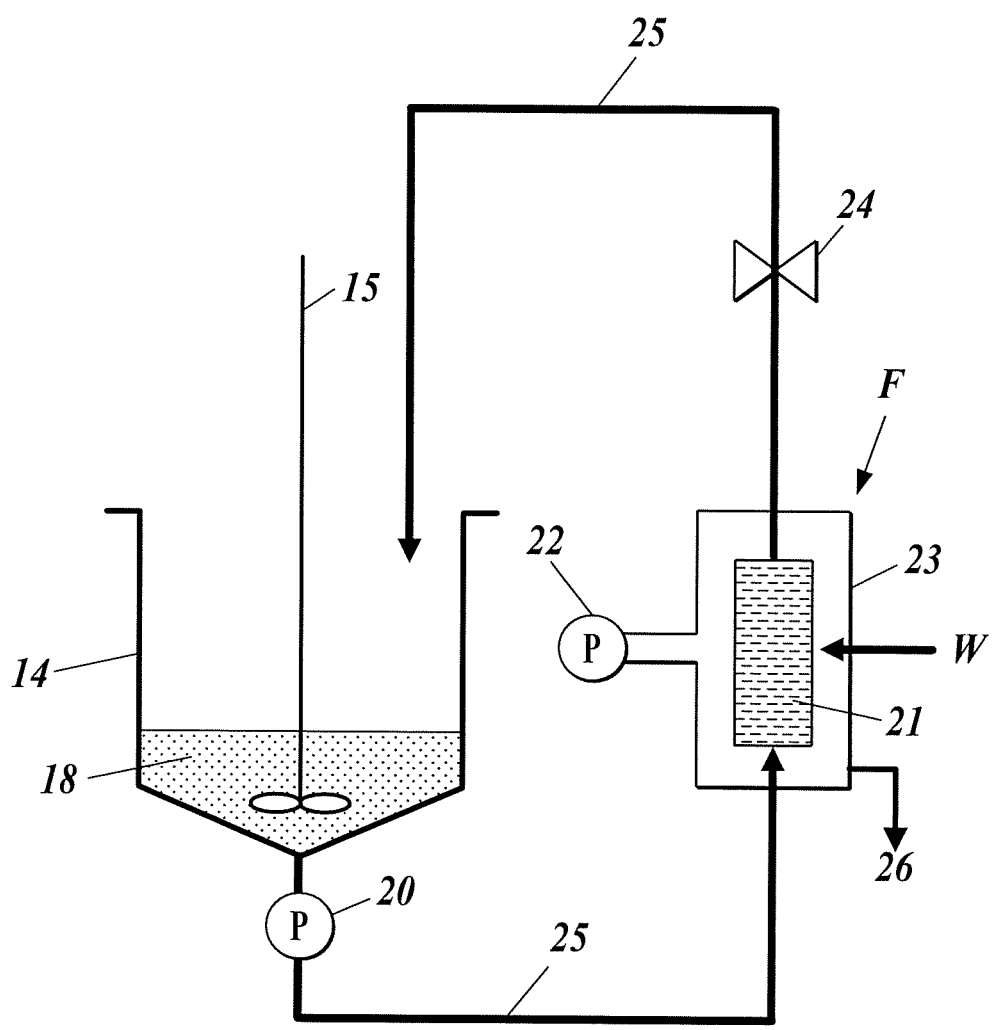
FIG. 3 This is a schematic diagram illustrating an example of a flow of filtration in a secondary concentrating step D of the method of the present invention for regenerating an abrasive.

FIG. 3 is a schematic diagram illustrating an example of a flow of filtration in the secondary concentrating step D of the method of the present invention for regenerating an abrasive.

In the secondary concentrating step D illustrated in FIG. 3, the separated concentrate 18 pooled in the conditioning container 14 and being stirred with the stirrer 15 is transferred to the filtration-concentration unit F using a pump 20. The filtration-concentration unit F is composed of a case filter (pressuring unit) 23, pressuring pump 22 and a filter 21. The concentrate 18 is passed through the filter 21 while the pressure in the case filter (pressuring unit) 23 is maintained to a fixed pressure using the pressuring pump 22 to remove mainly the supernatant 17 in the concentrate 18 with the filter 21. The removed supernatant 17 etc. are discharged to the outside of the case filter 23 through a pipe 26. In the upstream of the case filter (pressuring unit) 23, a pressure controlling valve is provided so as to maintain the pressure in the case filter 23 to a fixed condition. The concentrate 18 from which the impurities such as the supernatant 17 were removed is then passed through the pipe 25 and put in the conditioning container 14 again. By conducting this filtration process over a certain time period, the impurities in the concentrate 18 can be removed and the concentrate that contains a high-purity abrasive can be obtained.

In the secondary concentrating step D, when the concentration of the concentrate is excessively progressed and the viscosity etc. is excessively increased to the extent that the stable liquid transfer is difficult, it is preferable that the viscosity is adjusted by adding water or the like as needed. The secondary concentrating step D is conducted for removing the supernatant 17 which contains a polishing object component etc. from the concentrate 18 and does not inhibit addition of water.

After continuous filtration for a certain period, the abrasive particles are attached on the filter, and thus the filter is clogged, which decrease fineness of the filtration and separation. Thus, it is preferable that flowback water W is added from the outside of the filter to wash the filter on a routine basis.

The filter used in the secondary concentrating step D of the present invention is not particularly limited. Examples include hollow fiber filters, metal filters, wind filters, ceramic filters and roll-type polypropylene filters. Among them, ceramic filters are preferable for the present invention.

Examples of ceramic filters employable in the present invention include ceramic filters manufactured by TAMI Industries (France), ceramic filters manufactured by NORITAKE CO., LIMITED and ceramic filters manufactured by NGK INSULATORS, LTD. (e.g., CERALLEC DPF and Cefilt).

(5: Particle Size Adjusting Step E)

In the method of the present invention for regenerating an abrasive, it is preferable that the abrasive particles aggregated to form secondary particles are peptized to obtain a particle size distribution of primary particles, as a final step to make the used abrasive collected through the above steps reusable.

The concentrate collected by using inorganic salt, etc. to aggregate abrasive particles is composed of lumps of secondary particles. Thus, for the purpose of the reuse, it is preferable to conduct the particle size adjusting step E to cause re-dispersion through breaking the aggregate into pure particles (i.e., primary particles).

In the particle size adjusting step E, the aggregate of the abrasive component obtained in the second concentrating step is re-dispersed to adjust the particle size distribution to be equivalent to that in the unused abrasive-containing slurry (i.e., the abrasive-containing slurry before used in polishing).

Examples of the method for re-dispersing the aggregated abrasive particles are as follows: a) water is added to lower the concentration of the inorganic ion which has an aggregating effect on the abrasive in the solution; b) a metal-separating agent (or a dispersing agent) is added to lower the concentration of the metal ion on the abrasive; and c) the aggregated abrasive particles are forcibly peptized using a dispersing device or the like.

One of these methods can be used alone, or two or more of them may be used in combination. Preferably, any two of the methods a), b) and c) are used in combination. More preferably, all of the methods a), b) and c) are used in combination.

In the case of adding water, the amount of water to be added is adjusted based on the volume of the concentrated abrasive-containing slurry. Generally, the amount of water is 5 to 50% by volume of the concentrated slurry, and preferably 10 to 40% by volume of the concentrated slurry.

Preferable examples of the metal-separating agent (dispersing agent) include agents composed of a poly-carboxylic acid-based polymer including a carboxyl group. An acrylic acid-maleic acid copolymer is particularly preferable. Specifically, POLITY A-550 (manufactured by Lion Corporation) is given as an example. The amount of the metal-separating agent (dispersing agent) to be added to the concentrated abrasive-containing slurry is preferably 0.01 to 5% by volume.

Examples of the dispersing device include ultrasonic dispersers and media mills such as sand mills and bead mills. Ultrasonic dispersers are particularly preferable.

For example, ultrasonic dispersers are available from SMT Corporation, Ginsen Corporation, TAITEC Corporation, BRANSON, Kinematica AG, and NISSEI Corporation. Examples include UDU-1 and UH-600MC manufactured by SMT Corporation, GSD600CVP manufactured by Ginsen Corporation and RUS600TCVP manufactured by NISSEI Corporation. The frequency of ultrasonic is not particularly limited.

Examples of circulating type devices that conduct mechanical stirring and ultrasonic dispersion simultaneously include, but are not limited to, UDU-1 and UH-600MC manufactured by SMT Corporation, GSD600RCVP and GSD1200RCVP manufactured by Ginsen Corporation and RUS600TCVP manufactured by NISSEI Corporation.

Figure 4:
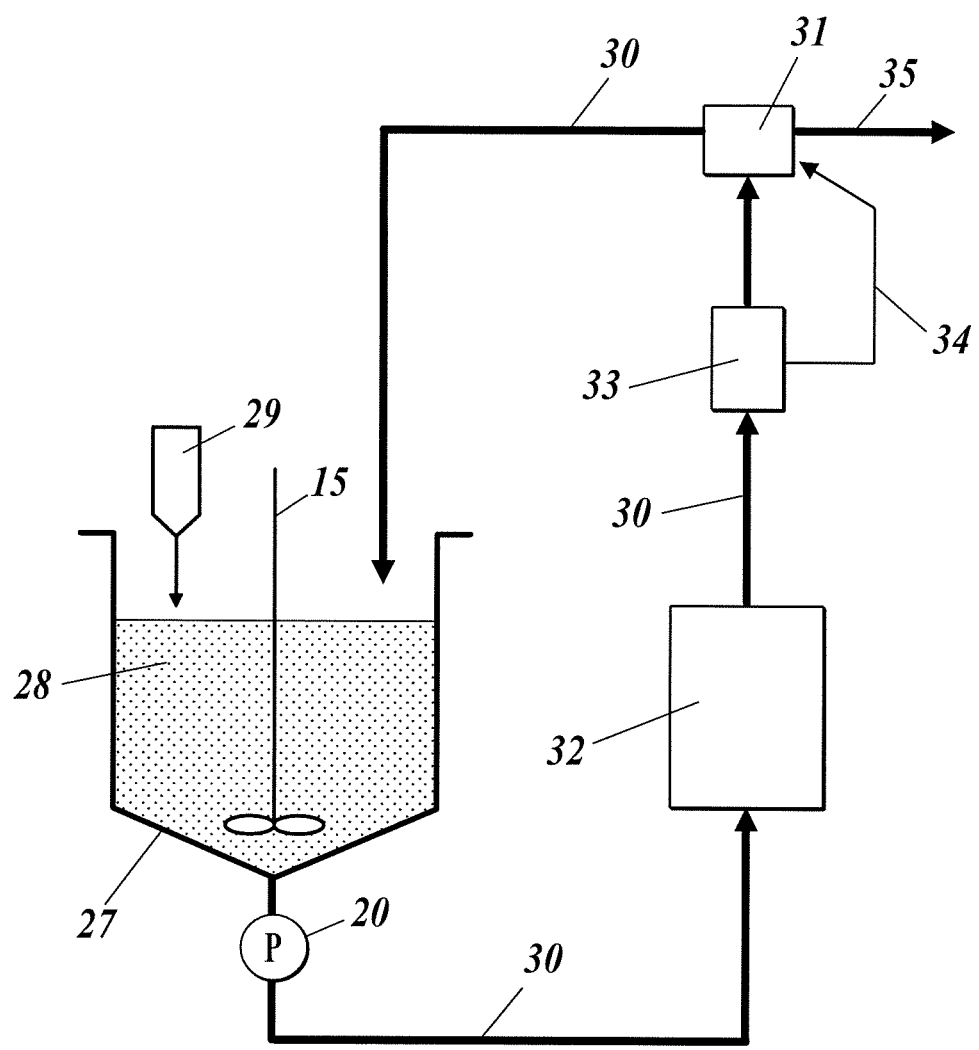
FIG. 4 This is a schematic diagram illustrating an example of a flow in a particle size adjusting step E using the ultrasonic disperser.

FIG. 4 is a schematic diagram illustrating an example of a flow in a particle size adjusting step E using an ultrasonic disperser.

As illustrated in FIG. 4, the particle size adjusting step E can be conducted as follows, for example: to the concentrate 18 prepared in the secondary concentrating step D, water is added to lower the concentration of the inorganic salt in the liquid to prepare an abrasive-dispersing liquid 28 and pools it in the conditioning container 27. Then, the metal-separating agent (dispersing agent composed of a polymer) is added to the abrasive-dispersing liquid 28 being stirred using a stirrer 15 from an addition container 29. Thereafter, the resulting liquid is passed through a flow path 30 using a pump 20 and then subjected to dispersion to break the aggregated particles of the abrasive using an ultrasonic disperser 32. Subsequently, the particle size distribution of the abrasive particles after dispersion is monitored using a particle size measuring device 33 provided in the downstream of the ultrasonic disperser 32. When the particle size distribution of the abrasive-dispersing liquid 28 does not reach a desired particle size distribution profile, then the abrasive-dispersing liquid 28 is transferred back to the conditioning container 27 through a three-way valve 31. Upon confirming that the particle size distribution of the abrasive-dispersing liquid 28 reached a desired particle size distribution profile, a three-way valve 31 is controlled, and the abrasive-dispersing liquid 28 is passed through a flow path 35. The regenerated abrasive can be thus obtained.

Preferably, a change with time of the particle size distribution obtained in this step is small, and a change in the particle size after one day has passed is small.

[Regenerated Abrasive]

In the present invention, the collected abrasive obtained after the particle size adjusting step E as a final product has a purity of 98% by mass or more, and the particle size distribution of the abrasive is difficult to change with time. The concentration is higher than that after the collection. The content of inorganic salt preferably ranges from 0.0005 to 0.08% by mass.

EXAMPLES

The present invention will now be described in detail with reference to Examples, but the present invention is not limited thereto. The percent sign "%" in the following description means "% by mass" unless described otherwise.

Example 1

Preparation of Regenerated Abrasive

[Preparation of Regenerated Abrasive 1: Comparative Example]

A regenerated abrasive 1 was prepared through the following steps. Cerium oxide was used as an abrasive. Regeneration of an abrasive was conducted at 25° C. and 55% RH unless described otherwise. In the regeneration, the temperature of the solution was also 25° C.

1) Slurry Collecting Step A

After a glass substrate for a hard disc was polished as a polishing process illustrated in FIG. 1 using cerium oxide (manufactured by C. I. Kasei Company, Limited), 210 liters of the first abrasive-containing slurry which contained the washing water and 30 liters of the second abrasive-containing slurry which had been used were collected, and then mixed to obtain 240 liters of the collected slurry. The specific weight of this collected slurry was 1.03, and the collected slurry contained 8.5 kg of cerium oxide (specific weight: 7.3).

2) Separating and Concentrating Step B

Subsequently, in the separating and concentrating step B in FIG. 2, as the step (B-1), the collected slurry was stirred so as not to cause sedimentation of cerium oxide and then as the step (B-2), 2.0 liters of 10% aqueous solution by mass of magnesium chloride was added as the inorganic salt using 10 minutes to the collected slurry. The stirring was continued for 30 minutes. The converted pH value right after the end of adding magnesium chloride at 25° C. was 8.60. Thereafter, as the step (B-3), the resulting slurry was left to stand for 45 minutes to cause spontaneous sedimentation. The concentrate and the supernatant were thus settled and separated.

3) Abrasive Collecting Step C

According to the abrasive collecting step C in FIG. 2, as the step (C-1), the supernatant 17 was discharged using the discharging pump 20, and as the step (C-2), the concentrate 18 was separated and collected. The volume of the collected concentrate 18 was 60 liters.

4) Particle Size Adjusting Step E (Dispersing Step)

To the separated concentrate, 12 liters of water was added. In addition, 300 g of POLITY A-550 (Manufactured by Lion Corporation) was added as the metal-separating agent (dispersing agent composed of a polymer) to the separated concentrate, followed by stirring for 30 minutes. Thereafter, the aggregated particles were broken and dispersed using an ultrasonic disperser (manufactured by Branson Ltd.), as illustrated in FIG. 4.

After the dispersion was completed, then filtration was conducted using a membrane filter with a pore size of 10 μm to obtain the regenerated cerium oxide-containing regenerated abrasive 1. The concentration of the cerium oxide was 8.7% by mass, and the particle size D90 was less than 2.0 μm. The concentration of magnesium in the regenerated abrasive was 0.03% by mass.

[Preparation of Regenerated Abrasive 2: Present Invention]

A regenerated abrasive 2 containing regenerated cerium oxide was prepared by the same way as the regenerated abrasive 1 was prepared except that 3) after the abrasive collecting step C, the filtration was conducted as 5) the secondary concentrating step D, and thereafter 4) the particle size adjusting step E (Dispersing step) was conducted for the dispersion.

5) Secondary Concentrating Step D

The secondary concentrating step D was conducted according to the filtration process (filtration apparatus) configured illustrated in FIG. 3.

As illustrated in the step (D-1) in FIG. 2 and FIG. 3, the concentrate 18 which had been collected through the step (C-2) of the abrasive collecting step C was transferred to the filtration-concentration unit F with the pump 20 while the concentrate 18 was slowly stirred with the stirrer 15 keeping a form of secondary aggregates. The filtration-concentration unit F was composed of the case filter (pressuring unit) 23, the pressuring pump 22 and the filter 21. The concentrate 18 was passed through the filter 21 while the pressure in the case filter (pressuring unit) 23 was fixed using the pressuring pump 22 to remove mainly the supernatant containing a glass component (silicon) in the concentrate 18 with the filter 21. The removed supernatant was discharged to the outside of the case filter (pressuring unit) 23 through the pipe 26. In the filtration, the concentrate 18 was circulated through the pipe 26 and the conditioning container at a flow rate of 1.2 L/min for 15 minutes until the volume of the concentrate 18 at the start of the filtration decreased by half.

As the filter 21 used in the secondary concentrating step D, a ceramic filter "Cefilt" (pore size: 0.5 μm) manufactured by NGK INSULATORS, LTD. was used.

[Preparation of Regenerated Abrasive 3: Present Invention]

A regenerated abrasive 3 was prepared by the same way as the regenerated abrasive 2 was prepared except that a metal filter manufactured by Pall Corporation (MDK4463) was used as the filter used in the secondary concentrating step D in place of the ceramic filter.

[Preparation of Regenerated Abrasive 4: Present Invention]

A regenerated abrasive 4 was prepared by the same way as the regenerated abrasive 2 was prepared except that a bead mill-type disperser (ULTRA APEX MILL, manufactured by KOTOBUKI INDUSTRIES CO., LTD.) was used as the dispersing device used in the particle size adjusting step E (dispersing step) in place of the ultrasonic disperser.

[Preparation of Regenerated Abrasive 5: Comparative Example]

A regenerated abrasive 5 was prepared by the same way as the regenerated abrasive 1 was prepared except that magnesium sulfate was used in the same amount in place of magnesium chloride as the inorganic salt used in the separating and concentrating step B.

[Preparation of Regenerated Abrasive 6: Present Invention]

A regenerated abrasive 6 was prepared by the same way as the regenerated abrasive 2 was prepared except that magnesium sulfate was used in the same amount in place of magnesium chloride as the inorganic salt used in the separating and concentrating step B.

[Preparation of Regenerated Abrasive 7: Comparative Example]

A regenerated abrasive 7 was prepared by the same way as the regenerated abrasive 1 was prepared except that pH of the slurry after the addition of the inorganic salt in the separating and concentrating step B was adjusted to 10.10 with potassium hydroxide.

[Preparation of Regenerated Abrasive 8: Present Invention]

A regenerated abrasive 8 was prepared by the same way as the regenerated abrasive 2 was prepared except that pH of the slurry after the addition of the inorganic salt in the separating and concentrating step B was adjusted to 10.10 with potassium hydroxide.

[Preparation of Regenerated Abrasive 9: Comparative Example]

A regenerated abrasive 9 was prepared by the same way as the regenerated abrasive 1 was prepared except that pH of the slurry after the addition of the inorganic salt in the separating and concentrating step B was adjusted to 10.45 with potassium hydroxide.

[Preparation of Regenerated Abrasive 10: Present Invention]

A regenerated abrasive 10 was prepared by the same way as the regenerated abrasive 2 was prepared except that pH of the slurry after the addition of the inorganic salt in the separating and concentrating step B was adjusted to 10.45 with potassium hydroxide.

[Preparation of Regenerated Abrasives 1 to 16]

Regenerated abrasives 11 to 16 were prepared by the same way as the regenerated abrasives 1 to 6 were prepared, respectively, except that zirconium oxide (manufactured by China HZ) was used in place of cerium oxide as the abrasive.

[Preparation of Regenerated Abrasives 17 and 18]

Regenerated abrasives 17 and 18 were prepared by the same way as the regenerated abrasives 1 and 2 were prepared, respectively, except that alumina (manufactured by NIHON MICRO COATING CO., LTD.) was used in place of cerium oxide as the abrasive.

[Preparation of Regenerated Abrasives 19 and 20]

Regenerated abrasives 19 and 20 were prepared by the same way as the regenerated abrasives 1 and 2 were prepared, respectively, except that alumina-zirconia (manufactured by Saint Gobain K.K.) was used in place of cerium oxide as the abrasive.

[Preparation of Regenerated Abrasives 21 and 22]

Regenerated abrasives 21 and 22 were prepared by the same way as the regenerated abrasives 1 and 2 were prepared, respectively, except that boron nitride was used in place of cerium oxide as the abrasive.

[Preparation of Regenerated Abrasive 23]

A regenerated abrasive 23 was prepared by conducting the slurry collecting step A, the secondary concentrating step D and the particle size adjusting step E (dispersing step) in this order without conducting the separating and concentrating step B and the abrasive collecting step C.

<<Evaluation of Regenerated Abrasive>>

[Evaluation for Purity of Regenerated Abrasive]

The regenerated abrasives 1 to 23 were subjected to component analysis using an ICP Atomic Emission spectrometer to obtain the purity of the regenerated abrasive, according to the following way.

For the evaluation, Si of the glass component and the element specific to the abrasive were quantified. Then, the content of Si of the glass component (mg/L) and the content of the element specific to the abrasive (g/L) were obtained.

(Component Analysis Using ICP Atomic Emission Spectrometry)

As to each regenerated abrasive, the content of the concentration of the abrasive-specific component (g/L) and the concentration of the glass component (Si component) (mg/L) were obtained. Specific steps are described below.

<Preparation of Sample Liquid A>

(a) 10 g of the regenerated abrasive was diluted with pure water in a volume of 90 ml, and 1 ml of the liquid was taken from the liquid being stirred using a stirrer (b) 5 ml of hydrofluoric acid for atomic absorption was added to the liquid (c) silica was eluted by ultrasonic dispersion (d) the liquid was left to stand at room temperature for 30 minutes (e) ultrapure water was added to the liquid to obtain a volume of 50 ml Each liquid prepared through the above steps is called the sample liquid A.

<Quantification of Si>

(a) the sample liquid A was filtrated using a membrane filter (hydrophilic PTFE)

(b) the filtrate was subjected to measurement using an Inductivity Coupled Plasma Atomic Emission spectrometer (ICP-AES)

(c) Si was quantified through a standard addition method

<Quantification of Abrasive-Specific Element>

(a) 5 ml of the sample liquid A was taken from the sample liquid A in a well dispersing state (b) 5 ml of high-purity sulfuric acid was added to and dissolved in the above taken liquid (c) ultrapure water was added to the liquid to obtain a volume of 50 ml (d) the liquid was diluted as needed with ultrapure water and subjected to measurement using ICP-AES (e) the abrasive-specific element was quantified through a calibration-curve method using matrix matching <ICP Atomic Emission Spectrometer>

An ICP-AES device manufactured by SII nanotechnology Inc. was used.

Results from the above measurements are shown in Table 1.

In table 1, pH in the separating and concentrating step B is a converted pH at 25° C.

TABLE 1

| REGENERATED ABRASIVE NO. | TYPE OF ABRASIVE | SEPARATING AND CONCENTRATING STEP B | | SECONDARY CONCENTRATING STEP D TYPE OF FILTER | PARTICLE SIZE ADJUSTING STEP E DISPERSING DEVICE | RESULT FROM ICP ANALYSIS | | NOTE |
|---|---|---|---|---|---|---|---|---|
| | | TYPE OF INORGANIC SALT | pH AFTER ADDTION OF INORGANIC SALT | | | Si CONCENTRATION (mg/L) | ABRASIVE CONCENTRATION (g/L) | |
| 1 | CERIUM OXIDE | MAGNESIUM CHLORIDE | 8.60 | NOT USED | ULTRASONIC DISPERSER | 915 | 110 | *2 |
| 2 | CERIUM OXIDE | MAGNESIUM CHLORIDE | 8.60 | CERAMIC FILTER | ULTRASONIC DISPERSER | 855 | 199 | *1 |
| 3 | CERIUM OXIDE | MAGNESIUM CHLORIDE | 8.60 | METAL FILTER | ULTRASONIC DISPERSER | 812 | 185 | *1 |
| 4 | CERIUM OXIDE | MAGNESIUM CHLORIDE | 8.60 | CERAMIC FILTER | BEAD MILL-TYPE DISPERSER | 811 | 175 | *1 |
| 5 | CERIUM OXIDE | MAGNESIUM SULFATE | 8.94 | NOT USED | ULTRASONIC DISPERSER | 923 | 102 | *2 |
| 6 | CERIUM OXIDE | MAGNESIUM SULFATE | 8.94 | CERAMIC FILTER | ULTRASONIC DISPERSER | 856 | 201 | *1 |
| 7 | CERIUM OXIDE | MAGNESIUM CHLORIDE | 10.10 | NOT USED | ULTRASONIC DISPERSER | 1109 | 77 | *2 |

TABLE 1-continued

| REGENERATED ABRASIVE NO. | TYPE OF ABRASIVE | SEPARATING AND CONCENTRATING STEP B | | SECONDARY CONCENTRATING STEP D TYPE OF FILTER | PARTICLE SIZE ADJUSTING STEP E TYPE OF DISPERSING DEVICE | RESULT FROM ICP ANALYSIS | | NOTE |
|---|---|---|---|---|---|---|---|---|
| | | TYPE OF INORGANIC SALT | pH AFTER ADDTION OF INORGANIC SALT | | | Si CONCENTRATION (mg/L) | ABRASIVE CONCENTRATION (g/L) | |
| 8 | CERIUM OXIDE | MAGNESIUM CHLORIDE | 10.10 | CERAMIC FILTER | ULTRASONIC DISPERSER | 1018 | 160 | *1 |
| 9 | CERIUM OXIDE | MAGNESIUM CHLORIDE | 10.45 | NOT USED | ULTRASONIC DISPERSER | 1218 | 73 | *2 |
| 10 | CERIUM OXIDE | MAGNESIUM CHLORIDE | 10.45 | CERAMIC FILTER | ULTRASONIC DISPERSER | 1100 | 162 | *1 |
| 11 | ZIRCONIUM OXIDE | MAGNESIUM CHLORIDE | 8.60 | NOT USED | ULTRASONIC DISPERSER | 887 | 111 | *2 |
| 12 | ZIRCONIUM OXIDE | MAGNESIUM CHLORIDE | 8.60 | CERAMIC FILTER | ULTRASONIC DISPERSER | 842 | 201 | *1 |
| 13 | ZIRCONIUM OXIDE | MAGNESIUM CHLORIDE | 8.60 | METAL FILTER | ULTRASONIC DISPERSER | 854 | 189 | *1 |
| 14 | ZIRCONIUM OXIDE | MAGNESIUM CHLORIDE | 8.60 | CERAMIC FILTER | BEAD MILL-TYPE DISPERSER | 832 | 178 | *1 |
| 15 | ZIRCONIUM OXIDE | MAGNESIUM SULFATE | 8.94 | NOT USED | ULTRASONIC DISPERSER | 918 | 100 | *2 |
| 16 | ZIRCONIUM OXIDE | MAGNESIUM SULFATE | 8.94 | CERAMIC FILTER | ULTRASONIC DISPERSER | 876 | 197 | *1 |
| 17 | ALUMINA | MAGNESIUM CHLORIDE | 8.60 | NOT USED | ULTRASONIC DISPERSER | 893 | 124 | *2 |
| 18 | ALUMINA | MAGNESIUM CHLORIDE | 8.60 | CERAMIC FILTER | ULTRASONIC DISPERSER | 821 | 221 | *1 |
| 19 | ALUMINA-ZIRCONIA | MAGNESIUM CHLORIDE | 8.60 | NOT USED | ULTRASONIC DISPERSER | 836 | 120 | *2 |
| 20 | ALUMINA-ZIRCONIA | MAGNESIUM CHLORIDE | 8.60 | CERAMIC FILTER | ULTRASONIC DISPERSER | 812 | 211 | *1 |
| 21 | BORON NITRIDE | MAGNESIUM CHLORIDE | 8.60 | NOT USED | ULTRASONIC DISPERSER | 882 | 155 | *2 |
| 22 | BORON NITRIDE | MAGNESIUM CHLORIDE | 8.60 | CERAMIC FILTER | ULTRASONIC DISPERSER | 811 | 289 | *1 |
| 23 | CERIUM OXIDE | — | — | CERAMIC FILTER | ULTRASONIC DISPERSER | 1523 | 155 | *2 |

*1 PRESENT INVENTION
*2 COMPARATIVE EXAMPLE

As evident from the result shown in Table 1, the methods of the present invention for regenerating the abrasive is excellent compared to those of the comparative examples because a high-purity regenerated abrasive can be obtained. It is evident that 4) secondary concentrating step D efficiently removes the glass component which is an impurity.

In the preparation of the regenerated abrasive 23, the separating and concentrating step B and the abrasive collecting step C were not conducted, and the separation was done only by the secondary concentrating step D. Thus, the filter was clogged in the secondary concentrating step D in a short time and the ability to separate the abrasive from the glass component was low.

Example 2

Regenerated abrasives 101 to 110 were prepared by the same way as the regenerated abrasives 1 to 10 were prepared, respectively, except that synthetic diamond (manufactured by NIHON MICRO COATING CO., LTD.) was used in place of cerium oxide used as the abrasive in the preparation of the regenerated abrasives 1 to 10 in Example 1. Regenerated abrasives 121 to 130 were prepared by the same way as the regenerated abrasives 1 to 10 were prepared, respectively, except that silicon carbide (manufactured by NIHON MICRO COATING CO., LTD.) was used in place of cerium oxide used as the abrasive in the preparation of the regenerated abrasives 1 to 10 in Example 1.

These abrasives were subjected to the evaluation same as the above, and the cases where synthetic diamond is used in place of cerium oxide as the abrasive and the cases where silicon carbide is used in place of cerium oxide as the abrasive can provide the equivalent effects as the regenerated abrasives 1 to 10 where cerium oxide is used as the abrasive.

INDUSTRIAL APPLICABILITY

By using the method of the present invention for regenerating an abrasive, an abrasive can be efficiently collected from the used abrasive, and a regenerated abrasive can be obtained in a simple manner. The method of the present invention can be suitably applied to regeneration of an abrasive used in fine polishing in the finishing step of an optical glass, crystal oscillator and the like.

DESCRIPTION OF REFERENCE NUMERALS

1 Abrasive device
2 Abrasive surface plate
3 Object to be polished
4 Abrasive-containing liquid
5 Slurry nozzle
7 Washing water
8 Washing water-spraying nozzle
10 Wash liquid containing abrasive 13 Abrasive-containing slurry (mother liquid)
14, 27 Conditioning container
15 Stirrer
16 Addition container
17 Supernatant
18 Concentrate
19 Discharging pipe
20 Pump
21 Filter
23 Case filter
24 Pressure controlling valve
31 Three-way valve
32 Ultrasonic disperser
33 Particle size measuring device
F Filtration-concentration unit
K Abrasive cloth
$T_1$ Slurry tank
$T_2$ Washing water tank
$T_3$ Wash liquid tank

The invention claimed is:

1. A method for regenerating an abrasive from a used abrasive-containing slurry, the method comprising:
   (A) collecting an abrasive-containing slurry discharged from an abrasive device;
   (B) adding an alkali earth metal salt to the abrasive-containing slurry collected in the step (A) to aggregate the abrasive and separating an aggregated abrasive from a mother liquid;
   (C) collecting the aggregated abrasive which is separated in the step (B); and
   (D) filtering the abrasive which is collected in the step (C) to secondarily concentrate the abrasive,
   wherein the abrasive is at least one selected from a group consisting of diamond, boron nitride, silicon carbide, alumina, alumina-zirconia, zirconium oxide and cerium oxide.

2. The method of claim 1, further comprising:
   (E) adjusting sizes of particles of the collected abrasive, after the step (D).

3. The method of claim 1, wherein the step (B) is conducted at a converted pH of less than 10.0 of the mother liquid at 25° C.

4. The method of claim 1, wherein the abrasive is cerium oxide.

5. The method of claim 1, wherein a first abrasive-containing slurry that contains washing water and a second abrasive-containing slurry that is used are collected in the step (A).

6. The method of claim 1, wherein the alkali earth metal salt used in the step (B) is a magnesium salt.

7. The method of claim 1, wherein in the step (C), the abrasive is collected through separation by decantation utilizing spontaneous sedimentation.

8. The method of claim 1, wherein the filtration is conducted using a ceramic filter in the step (D).

9. The method of claim 1, wherein in the step (D), the filtration is a repeated operation in which the abrasive collected in the step (C) is pooled in a container, the abrasive in the container is transferred and subjected to the filtration, and thereafter the abrasive is transferred back to the container.

10. The method of claim 1, wherein the step (D) is conducted while viscosity of the abrasive is controlled to an optimum level.

11. The method of claim 2, wherein in the step (D), a dispersing agent is added to a solution of the collected abrasive, and thereafter dispersion of the abrasive is conducted using an ultrasonic disperser and a bead mill disperser as a disperser to control the sizes of the particles of the regenerated abrasive.

12. The method of claim 11, wherein the disperser used in the step (D) is the ultrasonic disperser.

13. The method of claim 11, wherein the dispersing agent is composed of a poly-carboxylic acid-based polymer.

14. The method of claim 5, wherein the first abrasive-containing slurry and the second abrasive-containing slurry collected in the step (A) are mixed and thereafter subjected to the step (B), the step (C) and the step (D).

15. The method of claim 5, wherein the first abrasive-containing slurry and the second abrasive-containing slurry collected in the step (A) are separately subjected to the step (B), the step (C) and the step (D).

16. The method of claim 1 wherein the alkali earth metal salt is a halide, a sulfate, a carbonate, or an acetate.

* * * * *